(12) United States Patent
Motoi et al.

(10) Patent No.: US 10,173,452 B2
(45) Date of Patent: Jan. 8, 2019

(54) INFORMATION RECORDING MEDIA AND METHOD FOR PRINTING ON INFORMATION STORAGE MEDIA

(75) Inventors: Ayumi Motoi, Tokyo (JP); Tatsunosuke Ogawa, Tokyo (JP); Toru Nishioka, Tokyo (JP); Takumi Motoi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 695 days.

(21) Appl. No.: 13/879,277

(22) PCT Filed: Oct. 17, 2011

(86) PCT No.: PCT/JP2011/073816
§ 371 (c)(1),
(2), (4) Date: Sep. 12, 2013

(87) PCT Pub. No.: WO2012/050223
PCT Pub. Date: Apr. 19, 2012

(65) Prior Publication Data
US 2015/0298484 A1    Oct. 22, 2015

(30) Foreign Application Priority Data

Oct. 15, 2010 (JP) .................................. 2010-232419

(51) Int. Cl.
*B42D 25/328* (2014.01)
*B32B 27/08* (2006.01)
(Continued)

(52) U.S. Cl.
CPC .............. *B42D 25/328* (2014.10); *B32B 3/10* (2013.01); *B32B 27/08* (2013.01); *B41J 2/442* (2013.01);
(Continued)

(58) Field of Classification Search
CPC ..... Y10T 428/24802; Y10T 428/24851; Y10T 428/24868; Y10T 428/24917; B42D 25/23; B42D 25/328; B42D 25/41
See application file for complete search history.

(56) References Cited

U.S. PATENT DOCUMENTS 5,944,356 A * 8/1999 Bergmann ........... G06K 19/083
                                                                  283/109
2003/0136847 A1    7/2003 Braun
(Continued)

FOREIGN PATENT DOCUMENTS

JP      09-190670 A      7/1997
JP      2000-272276 A    10/2000
(Continued)

OTHER PUBLICATIONS

Machine translation of detailed description of JP 2002-032724 acquired Nov. 9, 2015.*

(Continued)

*Primary Examiner* — Gerard Higgins
(74) *Attorney, Agent, or Firm* — Locke Lord LLP (57) ABSTRACT

To provide an information storage medium and a method for printing on the information storage medium that can improve a quality of printing on a laser coloring layer in a lower than a functional film layer. A card 1 includes: a base material 11; a laser coloring layer 12 that is laminated upper Z2 than the base material 11 and produces color by laser irradiation; a transparent layer 13 that is laminated upper Z2 than the laser coloring layer 12 and is translucent; a Lippmann hologram layer 14 that is laminated upper Z2 than the transparent layer 13 and is translucent; and a transparent layer 15 that is laminated upper than the Lippmann hologram layer and is translucent.

15 Claims, 7 Drawing Sheets

(51) Int. Cl.
| | |
|---|---|
| B41J 2/44 | (2006.01) |
| B41J 2/47 | (2006.01) |
| B41M 5/26 | (2006.01) |
| B42D 25/41 | (2014.01) |
| G03H 1/02 | (2006.01) |
| B32B 3/10 | (2006.01) |
| B41M 3/14 | (2006.01) |
| B42D 25/45 | (2014.01) |

(52) U.S. Cl.
CPC .............. *B41J 2/47* (2013.01); *B41M 5/26* (2013.01); *B42D 25/41* (2014.10); *G03H 1/0256* (2013.01); *B32B 2307/31* (2013.01); *B32B 2307/402* (2013.01); *B32B 2307/412* (2013.01); *B32B 2307/414* (2013.01); *B32B 2425/00* (2013.01); *B32B 2429/00* (2013.01); *B41M 3/14* (2013.01); *B41M 5/267* (2013.01); *B42D 25/45* (2014.10); *G03H 1/0248* (2013.01); *G03H 2250/34* (2013.01); *Y10T 428/24802* (2015.01); *Y10T 428/24868* (2015.01)

(56) References Cited

U.S. PATENT DOCUMENTS

| | | |
|---|---|---|
| 2004/0022967 A1 | 2/2004 | Lutz et al. |
| 2004/0171162 A1* | 9/2004 | Neda ................ B41M 3/14 436/56 |
| 2008/0042427 A1* | 2/2008 | Muke ................ B42D 25/41 283/112 |

FOREIGN PATENT DOCUMENTS

| | | |
|---|---|---|
| JP | 2001-225553 A | 8/2001 |
| JP | 2001-232942 A | 8/2001 |
| JP | 2002032724 A | 1/2002 |
| JP | 2002140682 A | 5/2002 |
| JP | 2002-254833 A | 9/2002 |
| JP | 2005066871 A | 3/2005 |
| JP | 2006103221 A | 4/2006 |
| JP | 2007-044993 A | 2/2007 |

OTHER PUBLICATIONS

Machine translation of detailed description of JP 2006-103221 acquired Nov. 4, 2015.*
International Search Report of PCT/JP2011/073816.
Office Action dated Dec. 22, 2015, issued for Japanese Patent Application No. 2012-538739 and English translation thereof.
Extended European Search Report dated Oct. 14, 2015 in European Patent Application No. 11832648.7.
Office Action mailed on Aug. 2, 2016 issued for corresponding Japanese Patent Application No. 2012-538739.
Notice of Reasons for Rejection dated Sep. 12, 2017, issued to JP Patent Application No. 2016-215081 and English translation thereof.

* cited by examiner

TEST FOR CONFIRMING FOAMING AFTER LASER IRRADIATION

| | THIRD EMBODIMENT: CARD 301 | COMPARATIVE EXAMPLE 2: CARD 301-2 | COMPARATIVE EXAMPLE 3: CARD 301-3 |
|---|---|---|---|
| TRANSPARENT LAYER 15 | HEAT RESISTANT PET-G MANUFACTURED BY MITSUBISHI PLASTICS, INC. PA-C 50 μm IN THICKNESS | ←SAME AS ON THE LEFT | ←SAME AS ON THE LEFT |
| TRANSPARENT LAYER 13 | HEAT RESISTANT PET-G MANUFACTURED BY MITSUBISHI PLASTICS, INC. PA-C 50 μm IN THICKNESS | LOW TEMPERATURE PET-G MANUFACTURED BY MITSUBISHI PLASTICS, INC. PG-CHI 50 μm IN THICKNESS | PET-G THREE-LAYER COEXTRUSION (LOW TEMPERATURE/HEAT RESISTANT/LOW TEMPERATURE) MANUFACTURED BY MITSUBISHI PLASTICS, INC. PG-MCT 50 MM IN THICKNESS |
| LASER COLORING LAYER 12 | PET-G/POLYCARBONATE ALLOY RESIN MANUFACTURED BY MITSUBISHI PLASTICS, INC. PG-CLE 50 μm IN THICKNESS | ←SAME AS ON THE LEFT | ←SAME AS ON THE LEFT |
| BASE MATERIAL 11 | PET-G/POLYCARBONATE ALLOY RESIN MANUFACTURED BY MITSUBISHI PLASTICS, INC. PG-WET-HC 100 μm IN THICKNESS | ←SAME AS ON THE LEFT | ←SAME AS ON THE LEFT |
| FOAMING AFTER LASER IRRADIATION | NOT PRESENT | PRESENT (SUBSTANTIALLY) | PRESENT (MODERATELY) |

FIG. 6

LASER PRINTING TEST CONDITIONS AND RESULTS

LASER IRRADIATION APPARATUS: SCOPE 5400 MANUFACTURED BY Muhlbauer GROUP
LASER UNIT: LASER UNIT MANUFACTURED BY Rofin

| | | | | | | | | | | | |
|---|---|---|---|---|---|---|---|---|---|---|---|
| LASER BEAM INTENSITY (mA) | | | 31 | | | 34 | | | 37 | | |
| PRINTING SPEED (m/s) | | | 800 | | | 800 | | | 800 | | |
| LASER BEAM FREQUENCY (KHz) | | | 45 | | | 40 | 45 | 50 | 55 | 40 | 45 |
| DOT DENSITY (dpi) | 300 | 350 | 400 | 450 | 500 | | 400 | | | 400 | |
| COLORING DENSITY | ×× | × | × | △ | ○ ←6-1 | △ | × | × | ×× | ○○ ←6-2 | ○ ←6-3 |

INFORMATION RECORDING MEDIA AND METHOD FOR PRINTING ON INFORMATION STORAGE MEDIA

CROSS-REFERENCE TO RELATED APPLICATIONS

This application is the national phase under 35 U.S.C. § 371 of PCT International Application No. PCT/JP2011/073816, filed Oct. 17, 2011, which claims the benefit of Japanese Patent Application No. 2010-232419, filed Oct. 15, 2010, the entire contents of the aforementioned applications are hereby incorporated herein by reference.

TECHNICAL FIELD

The present invention, relates to an information storage medium provided with a functional film layer and a method for printing on the information storage medium.

BACKGROUND ART

Conventionally, an information storage body provided with an infrared absorbing layer lower than a hologram layer, the infrared absorbing layer being irradiated with a laser beam having passed through the hologram layer, to thereby color the infrared absorbing layer and store information has been known (for example, Patent Document 1).

However, in the conventional information storage body, the hologram layer could be damaged by heat generated by laser irradiation on the infrared absorbing layer. Therefore, intensity of the laser beam is restricted on low level, and this leads to a limited printing quality.

[Patent Document 1] Japanese Unexamined Patent Application Publication No. 2002-32724

DISCLOSURE OF THE INVENTION

Problems to be Solved by the Invention

A problem to be solved by the present invention is to provide an information storage medium and a method for printing on the information storage medium that can improve a quality of printing on a laser coloring layer positioned lower than a functional film layer.

Means for Solving the Problems

The present invention solved the problem by the following means. For the sake of easy understanding, configurations will be described with reference numerals corresponding to those of embodiments of the present invention; however, the present invention is not limited thereto. The configurations described with the reference numerals can be modified appropriately and at least a part thereof can be replaced by another constitutional element.

A first aspect of the present invention is an information storage medium including: a base material (11); a laser coloring layer (12) that is laminated upper than the base material and produces color by laser irradiation; a lower transparent layer (13) that is laminated upper than the laser coloring layer and is translucent; a functional film layer (14) that is laminated upper than the lower transparent layer and is translucent; and an upper transparent layer (15) that is laminated upper than the functional film layer and is translucent.

According to a second aspect of the present invention, in the information storage medium of the first aspect, the lower transparent layer (13) has resistance to heat generated by the laser irradiation to the laser coloring layer (12).

According to a third aspect of the present invention, in the information storage medium of the first or second aspect, the functional film layer (14) is any one of a hologram layer and a microtaggant film layer.

According to a fourth aspect of the present invention, in the information storage medium of any one of the first to third aspects, the functional film layer (14) is smaller than the information storage medium (1) when viewed from a normal direction of a surface (1a) of the information storage medium.

Accorfing to a fifth aspect of the present invention, in the information storage medium of any one of the first to fourth aspects, the functional film layer (14, 214) has a region overlapping a region (1b, 201b) of the laser coloring layer (12) colored by the laser irradiation when viewed from a normal direction of a surface (1a) of the information storage medium.

According to a sixth aspect of the present invention, in the information storage medium of any one of the first to fifth aspects, the functional film layer (14) is provided with a heat sealing layer (14a) at least on any one of: a side of the upper transparent layer; and a side of the lower transparent layer.

According to a seventh aspect of the present invention, in the information storage medium of any one of the first to fifth aspects, the functional film layer (214) is formed on an inner side of an outer periphery of a region (201b) of the laser coloring layer (12) colored by the laser irradiation when viewed from a normal direction of a surface of the information storage medium (201).

According to an eighth aspect of the present invention, in the information storage medium of any one of the first to seventh aspects, the laser coloring layer (12) is translucent.

A ninth aspect of the present invention is a method for printing on the information storage medium according to any one of the first to eighth aspects, including irradiating the information storage medium (1) with a laser beam (L) from an upper side (1a) thereof, making the laser beam passing through the upper transparent layer (15), the functional film layer (14), and the lower transparent layer (13), to thereby coloring the laser coloring layer (12).

Effects of the Invention

According to the invention, the following effects can be provided.

In the first aspect of the invention, the lower transparent layer laminated upper than the laser coloring layer and the functional film layer laminated upper than the lower transparent layer, allowing the lower transparent layer to reside between the laser coloring layer and the functional film layer. The lower transparent layer can thus suppress transfer of heat generated by the laser irradiation from the laser coloring layer to the functional film layer, thereby suppressing damage to the functional film layer. A more intense laser beam can thus be irradiated onto the laser coloring layer, thereby improving a coloring effect and the printing quality.

In the second aspect of the invention, the lower transparent layer has resistance to heat generated by the laser irradiation to the laser coloring layer. This can suppress damage to the lower transparent layer (foaming and the like) due to the laser irradiation, thereby allowing a more intense laser beam to be irradiated and improving the printing quality.

In the third aspect of the invention, since the functional film layer is a hologram layer or a microtaggant film layer, hologram and microscopic print can provide an effect of preventing counterfeiting.

In the fourth aspect of the invention, since the functional film layer is smaller than the information storage medium, the functional film layer can be provided only partially, thereby reducing cost.

In addition, since the functional film layer overlaps the laser printed region, tampering of laser-printed information is not possible without breaking the functional film layer. This provides a potent effect of preventing counterfeiting and tampering.

In the fifth aspect of the invention, since the functional film layer is provided with a heat sealing layer at least on any one of a side of the upper transparent layer and a side of the lower transparent layer, an effect of thermal compression bonding can be improved and separation can be prevented between the functional film layer and any one of the upper transparent layer and the lower transparent layer.

In the sixth aspect of the invention, since the functional film layer has a region overlapping a region colored by the laser irradiation, in a case of, for example, printing an image such as a photograph by coloring by laser irradiation, an effect of the functional film layer can be produced in a part of the image.

In the seventh aspect of the invention, since the functional film layer is formed on an inner side of an outer periphery of a region colored by the laser irradiation, the entire functional film layer can be arranged within the colored region, facilitating counterfeit detection.

In the eighth aspect of the invention, since the laser coloring layer is translucent. Though a printed layer is provided lower than the laser coloring layer, printed contents can be visually recognized.

In the ninth aspect of the invention, since a laser beam passes through the upper transparent layer, the functional film layer, and the lower transparent layer, to thereby color the laser coloring layer, a similar effect to those of the first to eighth aspects can be provided.

PREFERRED MODE FOR CARRYING OUT THE INVENTION

First Embodiment

Preferred embodiments of the present invention will be described hereinafter with reference to the drawings.

FIG. 1 is a plan view, a cross-sectional view, and a perspective view illustrating a layered configuration of a card 1 according to the first embodiment.

Figure 1A:
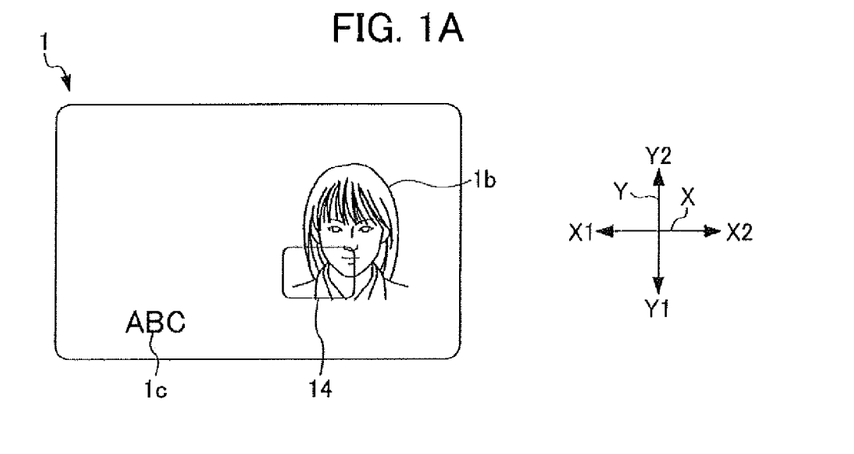
FIG. 1 is a plan view, a cross-sectional view, and a perspective view illustrating a layered configuration of a card 1 according to a first embodiment.

FIG. 1A is a plan view of the card 1 (diagram viewed from a normal direction of a surface 1a of the card 1).

Figure 1B:
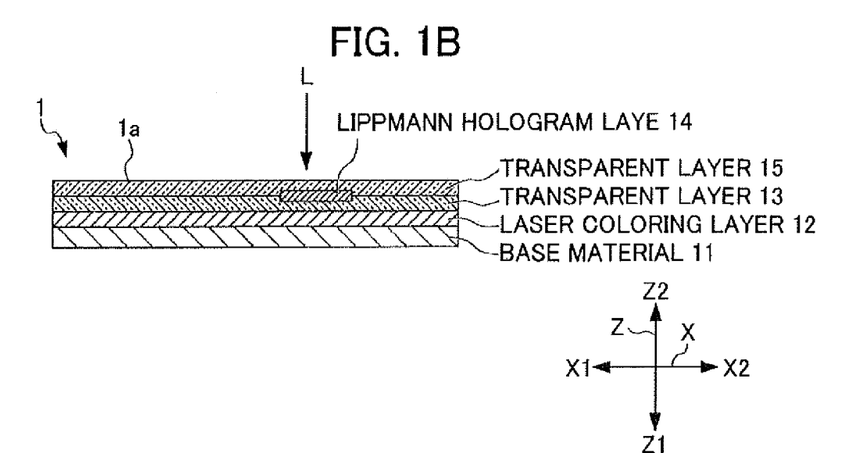

FIG. 1B is a cross-sectional view of the card 1 (a cross-sectional view taken along the line B-B of FIG. 1).

Figure 1C:
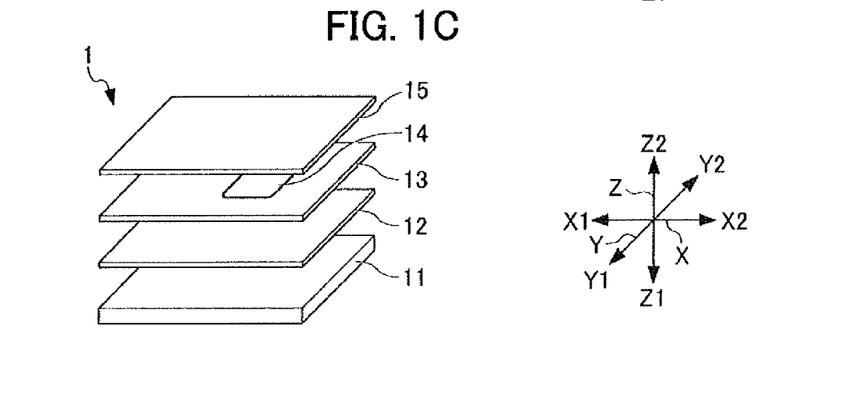

FIG. 1C is a perspective view illustrating the layered configuration of the card 1.

The card 1 (information storage medium) is configured by stacking on a base material 11, from a lower layer side Z1: a laser coloring layer 12; a transparent layer 13 (lower transparent layer); a Lippmann hologram layer 14 (functional film layer); and a transparent layer 15 (upper transparent layer). These layers are formed of a resin sheet material such as PET, PET-G, PVC and the like. These layers can be bound with a bonding layer or a sticky layer, as well as by thermal compression bonding.

The base material 11 is a member composing a base for the card 1. In the first embodiment, an example of providing a layered configuration on an upper layer side Z2 of the base material 11 is described; however, a layered configuration can also be provided on the lower layer side Z1 of the base material 11 as necessary.

The laser coloring layer 12 is a layer on which printing by laser irradiation is possible, and generally includes a coloring agent that improves a coloring effect by laser irradiation. The laser coloring layer 12 is translucent. Therefore, in a case in which a printed layer is provided on the lower layer side Z1 of the laser coloring layer 12, and a background pattern is printed on the printed layer, the printed pattern can be visually recognized through the laser coloring layer 12. The laser coloring layer 12 can be composed of any material, with or without the coloring agent, which produces or changes color in response to external energy such as heat and light. For example, polycarbonate alone or PVC materials can be used.

The transparent layer 13 is a layer having translucency.

The Lippmann hologram layer 14 provides a translucent hologram. The Lippmann hologram layer 14 is a layer including a Lippmann hologram.

The Lippmann hologram layer 14 is configured such that a special polymer layer is applied on a film and an interference pattern is formed in the polymer layer by the change of refractive index. The Lippmann hologram layer 14 reproduces a hologram image in response to light incident upon the interference pattern, due to a diffraction phenomenon. The Lippmann hologram layer 14 is superior in providing a vertical and horizontal stereoscopic effect and a depth effect, and can provide a more realistic stereoscopic image. The Lippmann hologram layer 14 is extremely difficult to counterfeit due to the special material and manufacturing process thereof. As a result, anti-counterfeiting properties can be improved compared to, for example, an embossed hologram.

As shown in FIG. 1A, external dimensions of the Lippmann hologram layer 14 are smaller than external dimensions of the card 1. In other words, the base material 11, the laser coloring layer 12, the transparent layer 13, and the transparent layer 15 are sized similar to the outer dimensions of the card, and the Lippmann hologram layer 14 is provided only in a limited region on the transparent layer 13. This is to reduce the cost by making the expensive Lippmann hologram layer 14 small.

The transparent layer 15 is a layer having translucency.

A method for manufacturing the card 1 is described hereinafter.

The manufacture of the card 1 includes the following steps.

(Layering Step)

From the lower layer side Z1, the laser coloring layer 12 before printing; the transparent layer 13; the Lippmann hologram layer 14 with a hologram formed thereon; and the transparent layer 15 are layered on the base material 11, and the layers are joined with each other by a bonding layer, a sticky layer, or thermal compression bonding or the like.

In a case of making the card 1 in a gang-printing manner, a punching process is provided after the layering step to thereby make individual cards 1.

(Printing Step)

Printed images 1b, 1c are printed by irradiating the laser beam L from a card surface 1a, in other words a surface of the transparent layer 15.

The printed image 1b is arranged such that a part thereof overlaps the Lippmann hologram layer 14 in a plan view (FIG. 1A). In a region in which the Lippmann hologram layer 14 is provided, such as the printed image 1b, the laser beam L passes through the transparent layer 15 and Lippmann hologram layer 14. The laser beam L then passes through the transparent layer 13 and reaches the laser coloring layer 12, thereby coloring the laser coloring layer 12.

In a region in which the Lippmann hologram layer 14 is not provided, such as the printed image 1c, the laser beam L passes through the transparent layer 15 and then passes through the transparent layer 13 and reaches the laser coloring layer 12, thereby coloring the laser coloring layer 12.

The card 1 is thus manufactured.

In the printing step, the laser coloring layer 12 generates heat in response to the laser irradiation. In a region in which the Lippmann hologram layer 14 is provided, the heat from the laser coloring layer 12 reaches the Lippmann hologram layer 14 in such a way that the heat is first transferred to the transparent layer 13; and then the heat transferred to the transparent layer 13 is transferred to the Lippmann hologram layer 14. The transparent layer 13 thus functions as a heat insulator and prevents the heat from the laser coloring layer 12 from being directly transferred to the Lippmann hologram layer 14. In a case in which the transparent layer 13 is provided, even if an intense laser beam L is used, damage to the Lippmann hologram layer 14 can be suppressed compared to a case in which the transparent layer 13 is not provided. A more intense laser beam L can thus be irradiated onto the laser coloring layer 12, thereby improving a coloring effect of the laser coloring layer 12 and the printing quality.

(Comparative Experiment)

Figure 2A:
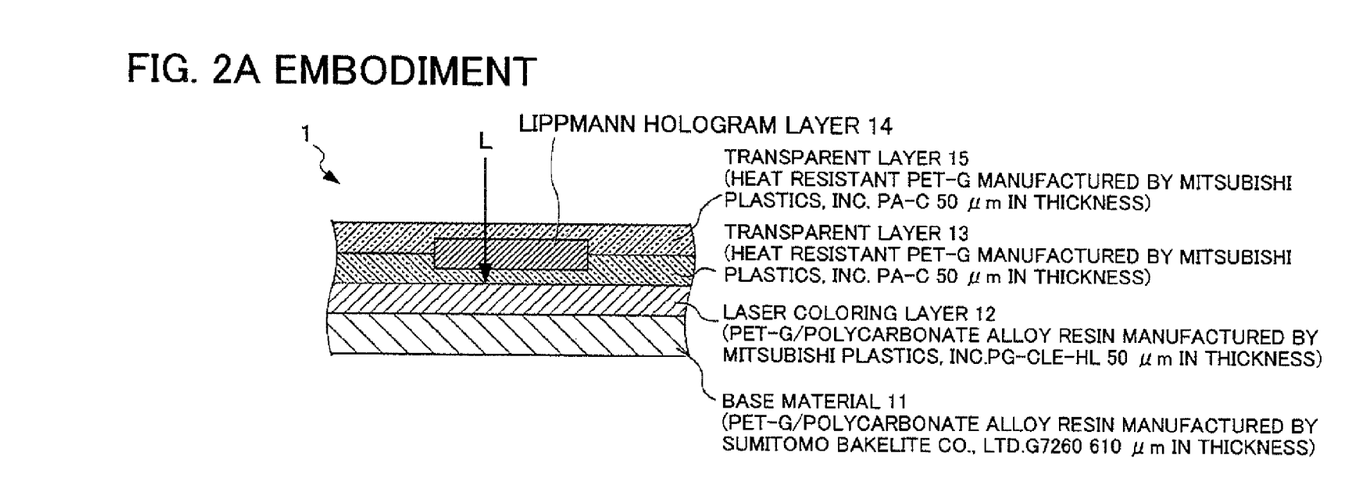
FIG. 2 is a cross-sectional view illustrating a layer configuration of the card 1 according to the first embodiment and a layer configuration of a card 101 of a comparative example, used for a comparative experiment.
Figure 2B:
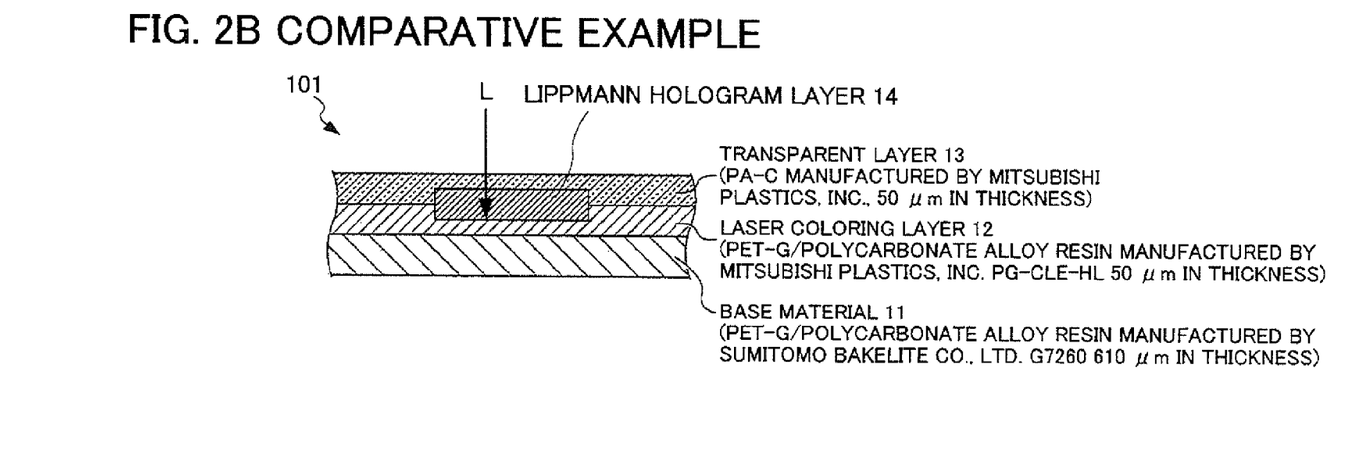

FIG. 2 is a cross-sectional view illustrating a layer configuration of the card 1 according to the first embodiment and a layer configuration of a card 101 of a comparative example, used for a comparative experiment.

The card 101 of Comparative Example is different from the card 1 of the first embodiment in having a conventional layer configuration without the transparent layer 13.

The materials for the layers are as follows:

the base material 11: PET-G/polycarbonate alloy resin (G7260 manufactured by SUMITOMO BAKELITE CO., LTD.) 610 μm in thickness;

the transparent layers 13, 15: heat resistant PET-G (PA-C manufactured by MITSUBISHI PLASTICS, INC.) 50 μm in thickness; and the laser coloring layer 12: PET--G/polycarbonate alloy resin (PG-CLE-HL manufactured by MITSUBISHI PLASTICS, INC.) 50 μm in thickness.

(Experiment Method)

(1) Using a laser unit manufactured by Rofin for a card issuing machine SCOPE 5400 manufactured by Muhlbauer Group, printing was performed on a region in which the Lippmann hologram layer 14 is provided in the laser coloring layer 12 of the card 1 of the first embodiment, under the following conditions. The printed image 1b was a picture of a person as shown in FIG. 1A.

Laser wavelength: 1064 nm

Current value: 37.0 A

Imaging speed: 800 m/s

Frequency: 45 kHz

Number of pixels: 400 dpi (2) After performing the printing under the above conditions, the printing quality (color density, contrast, and the like) and absence of damage to the Lippmann hologram layer 14 in the card 1 of the first embodiment were confirmed with the naked eye.

(3) Printing was performed on the card 101 of Comparative Example under the same conditions as the above. In the card 101 of Comparative Example, foaming of the Lippmann hologram layer 14 (without discoloration) was confirmed with the naked eye. In other words, the Lippmann hologram layer 14 was damaged, From the above experimental result, it was confirmed that, in the card 1 of the first embodiment, an intense laser beam L can be used without damaging the Lippmann hologram layer 14, thereby improving the printing quality, compared to the card 101 of Comparative Example. As described above, the card 1 of the first embodiment can suppress damage on the Lippmann hologram layer 14 upon printing by providing the lower transparent layer between the laser coloring layer 12 and the Lippmann hologram layer 14, thereby improving the printing quality.

Second Embodiment

A second embodiment of the present invention is described hereinafter.

In the following description and the drawings, components that function similarly to those of the first embodiment are referred to by the same reference numerals or reference numerals that end with the same reference numerals, and redundant descriptions are omitted.

Figure 3:
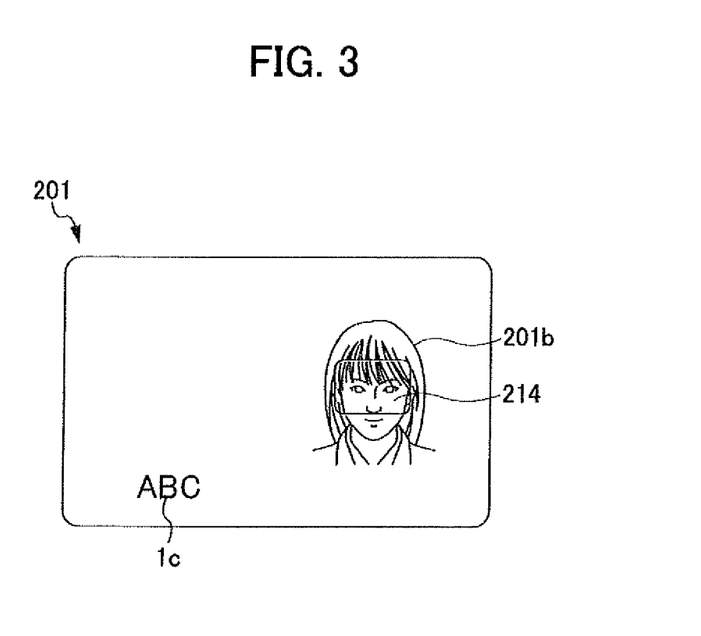
FIG. 3 is a plan view of a card 201 according to the second embodiment.

FIG. 3 is a plan view of a card 201 according to the second embodiment (corresponding to FIG. 1A).

The layer configuration of the card 201 is similar to that of the card 1 of the first embodiment (refer to FIG. 1B and FIG. 1C); however, the Lippmann hologram layer 214 is positioned within the printed image 201b in a plan view. In other words, when forming the printed image by coloring the laser coloring layer 12 by laser irradiation (refer to FIG. 1), it is formed inside of the outer periphery of the printed image 201b colored by the laser irradiation. As a result, the entire Lippmann hologram layer 214 can be positioned within the printed image 201b, thereby making a region of overlap between the printed image 201b and the Lippmann hologram layer 214 greater.

Given this, in the card 201, an effect of hologram in the Lippmann hologram layer 214 can be maximized, further facilitating counterfeit detection by alteration and the like of the Lippmann hologram layer 214.

Third Embodiment

A third embodiment of the present invention is described hereinafter.

Figure 4:
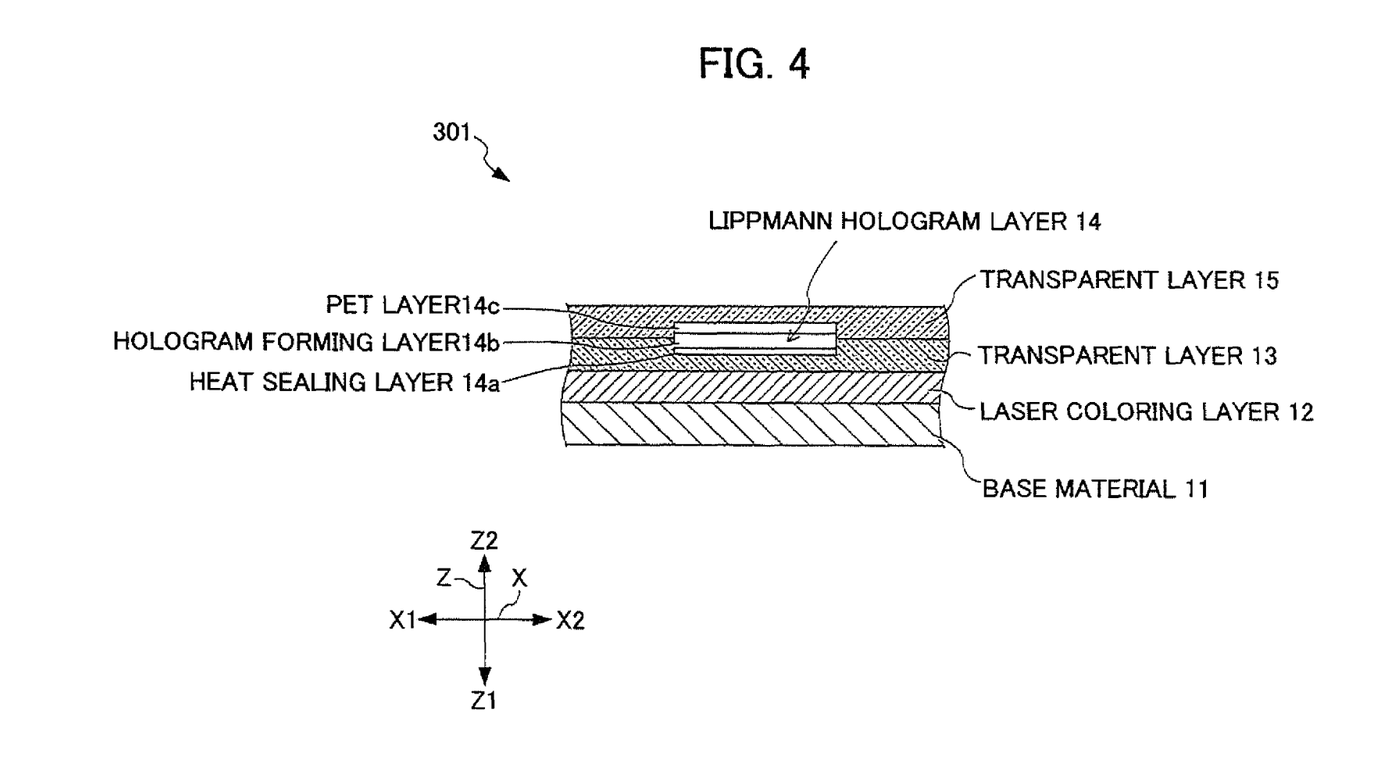
FIG. 4 is a cross-sectional view (corresponding to FIG. 2A) of a card 301 according to the third embodiment.

FIG. 4 is a cross-sectional view (corresponding to FIG. 2A) of a card 301 according to the third embodiment.

In the Lippmann hologram layer 14 of the third embodiment, a heat sealing layer 14a, a hologram forming layer 14b, and a PET layer 14c are layered from the lower layer side Z1.

The heat sealing layer 14a is a sheet for joining the Lippmann hologram layer 14 to the transparent layer 13 by thermal compression bonding. The thickness of the heat sealing layer 14a is 4 μm.

The hologram forming layer 14b is a layer in which a hologram image is actually formed. The thickness of the hologram forming layer 14b is 10 μm.

The PET layer 14c is a layer for protecting the hologram forming layer 14b. The thickness of the PET layer 14c is 16 μm.

By the above-described configuration, in the card 301, separation of the Lippmann hologram layer 14 from the transparent layer 13 can be suppressed.

The total thickness of the Lippmann hologram layer 14 is 30 μm (=4 μm+10 μm+16 μm). The Lippmann hologram layer 14 is thus smaller in thickness than other layers. By reducing the thickness of the Lippmann hologram layer 14, unevenness on the surface of the card is reduced to thereby improve appearance thereof.

The card 301 can also be configured such that, in a reversed manner of FIG. 4, the heat sealing layer 14a can be formed on the upper layer side Z2 of the hologram forming layer 14b and the PET layer 14c can be formed on a lower layer side Z1 of the hologram forming layer 14b. In such a case, separation of the Lippmann hologram layer 14 from the transparent layer 15 can be suppressed.

Alternatively, in the card 301, the heat sealing layer 14a can be provided above and below the hologram forming layer 14b. In such a case, separation of the Lippmann hologram layer 14 from the transparent layers 13, 15 can be suppressed.

(Foaming Confirmation Test)

A confirmation test was conducted for confirming a foaming (damage) state after the laser irradiation of the card 301 of the third embodiment and cards 301-2 and 301-3 of Comparative Examples.

Figure 5:
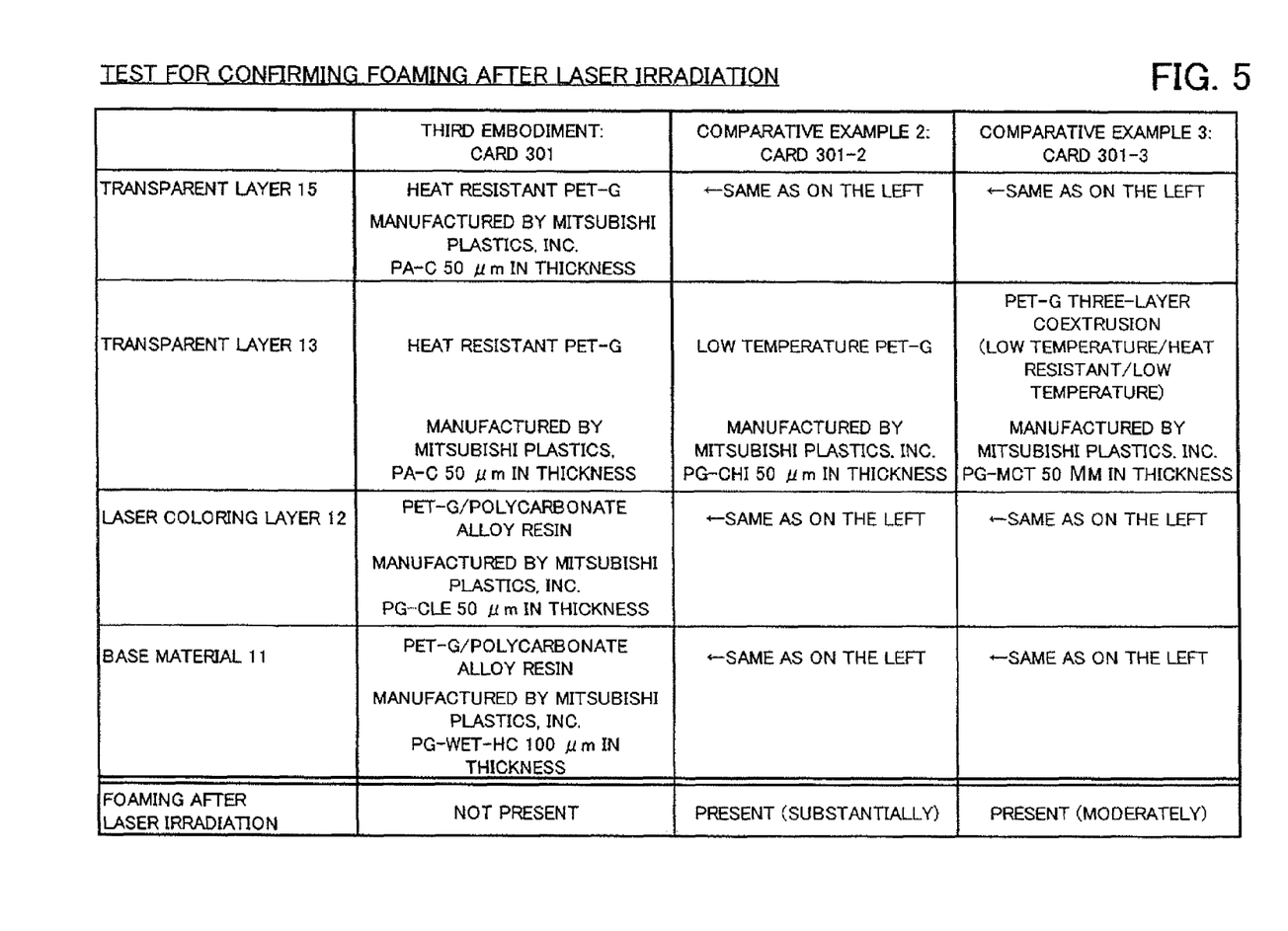
FIG. 5 is a table showing results of a test for confirmation of foaming due to laser irradiation, practiced on the third embodiment and the comparative example.

FIG. 5 is a table showing results of a test for confirmation of foaming due to laser irradiation, practiced on the third embodiment and the comparative example.

The materials composing the card 301 according to the third embodiment are as follows:

the base material 11: PET-G/polycarbonate alloy resin (PG-WET-HC manufactured by MITSUBISHI PLASTICS, INC.) 100 μm in thickness;

the laser coloring layer 12: PET-G/polycarbonate alloy resin (PG-CLE manufactured by MITSUBISHI PLASTICS, INC.) 50 μm in thickness; and the transparent layers 13, 15: heat resistant PET-G (PA-C manufactured by MITSUBISHI PLASTICS, INC.) 50 μm in thickness.

In the cards 301-2 and 301-3 of Comparative Examples, the material for the transparent layer 13 on the lower layer side Z1 was changed to a non heat-resistant material, as follows:

Cards 301-2 of Comparative Example the transparent layer 13: low temperature PET--G (PG-CHI manufactured by MITSUBISHI PLASTICS, INC.) 50 μm in thickness;

Cards 301-3 of Comparative Example the transparent layer 13: three-layer coextruded PET-G (low temperature/heat resistant/low temperature) (PG-MCT manufactured by MITSUBISHI PLASTICS, INC.) 50 μm in thickness. (Experiment Method and Results)

The laser irradiation was performed to the cards 301-2, 301-3 of Comparative Examples under the same conditions whereby no foaming was recognized by the naked eye in the laser coloring layer 12 and the transparent layer 13 of the card 301 of the third embodiment after the laser irradiation (laser printing).

As a result, in both cards 301-2, 301-3 of the Comparative Examples, foaming was recognized in the transparent layer 13. In addition, the surfaces of the cards became uneven due to the foaming. The card 301-2 using the low temperature PET-G was in an extremely poor state.

As described above, it was confirmed that the card 301 of the third embodiment can suppress generation of foam during the laser irradiation by employing the heat resistant PET-G in the transparent layer 13.

(Laser Printing Test)

The following laser printing test was conducted in order to determine a printing condition that allows denser printing of the printed image while suppressing foaming during the laser irradiation.

Figure 6:
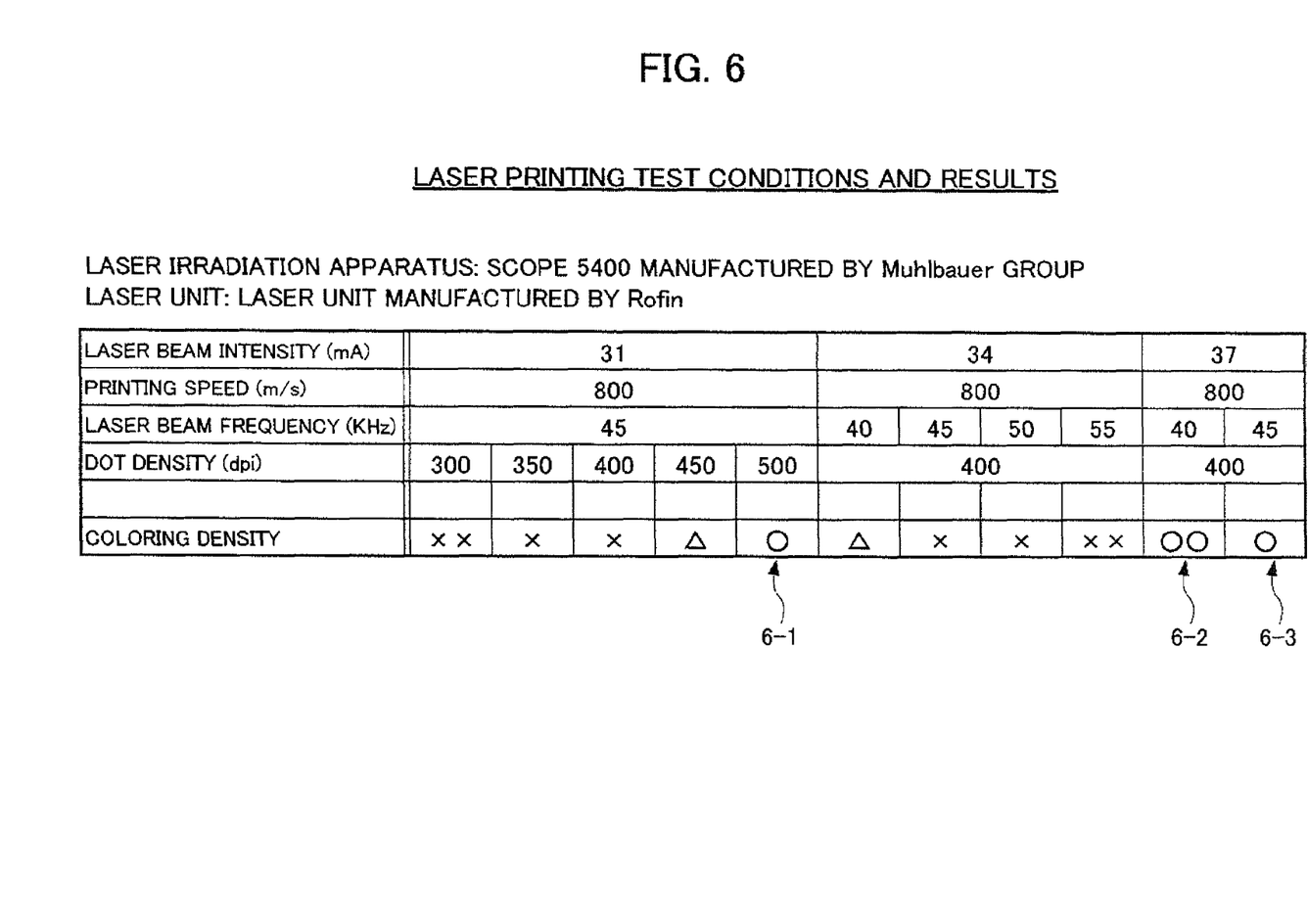
FIG. 6 is a table showing results of confirmation of color densities of a card 301 according to a third embodiment, under various laser irradiation conditions.

FIG. 6 is a table showing results of confirmation of color densities of the card 301 according to the third embodiment, under various laser irradiation conditions.

Using a laser unit manufactured by Rofin for a card issuing machine SCOPE 5400 manufactured by Muhlbauer Group, printing was performed on a region in which the Lippmann hologram layer 14 is provided in the laser coloring layer 12 of the card 301.

The following conditions were appropriately combined as the printing conditions.

Laser beam (mA): 31, 34, 37;
Printing speed (m/s): 800 (common);
Laser beam frequency (kHz): 40, 45, 50, 55;
Dot density (dpi): 300, 350, 400, 450, 500.

The layer configuration of the card 301 was similar to that in the foaming confirmation test.

Coloring density of the printing was visually confirmed.
(Laser Printing Confirmation Result)

Coloring densities are indicated by the following indices in FIG. 6.

XX: Extremely low in density
X: Low in density
Δ: Relatively low in density
O: Superior in density
OO: Particularly superior in density As shown in FIG. 6, it was confirmed that printing results of the following conditions were superior or particularly superior.

6-1: 31 mA, 800 mA, 45 kHz, 500 dpi
6-2: 37 mA, 800 mA, 40 kHz, 400 dpi
6-3: 37 mA, 800 mA, 45 kHz, 400 dpi As described above, in the card 301 of the present embodiment, since the Lippmann hologram layer 14 includes the heat sealing layer 14a, and therefore, the results of the thermal compression bonding can be improved and separation thereof from the transparent layer 13 and the like can be suppressed.

In addition, in the card 301, since the transparent layer 13 of the lower layer side Z1 is heat resistant, more intense laser beam can be irradiated, thereby improving the printing quality.

Fourth Embodiment

A fourth embodiment of the present invention is described hereinafter.

Figure 7A:
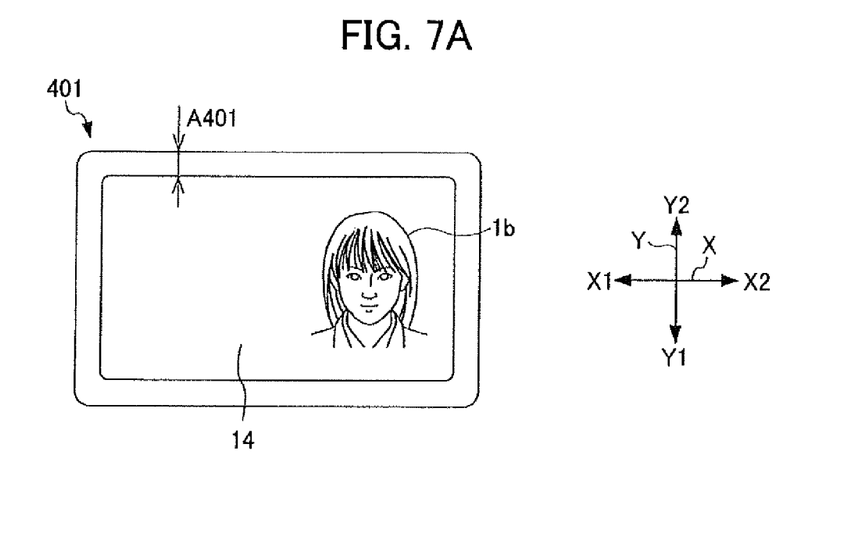
FIG. 7 is a plan view (corresponding to FIG. A) and a cross-sectional view (corresponding to FIG. 1B) of a card 401 according to a fourth embodiment.
Figure 7B:
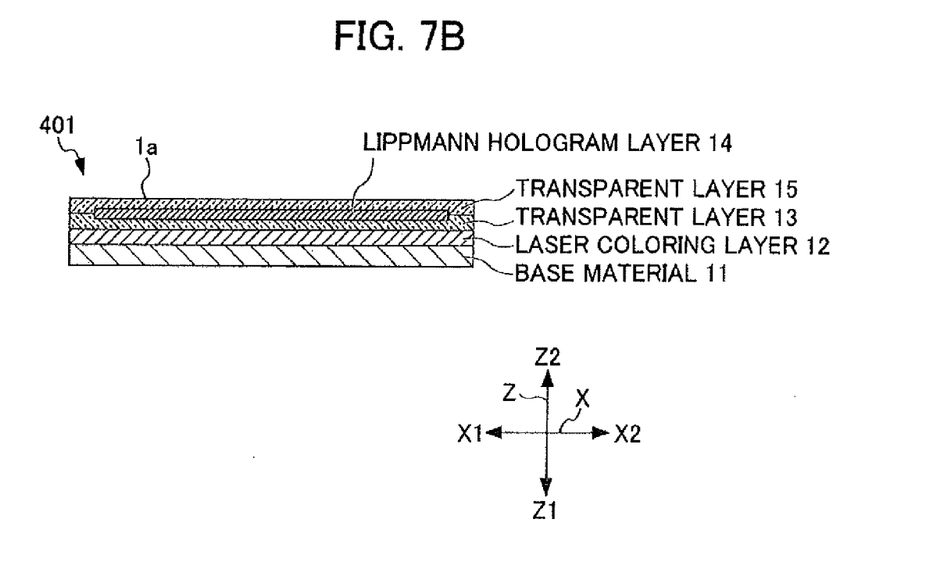

FIG. 7 is a plan view (corresponding to FIG. 1A) and a cross-sectional view (corresponding to FIG. 1B) of a card 401 according to a fourth embodiment.

As shown in FIG. 7A, external dimensions of the Lippmann hologram layer 14 are slightly smaller than external dimensions of the card 401.

In the present embodiment, the Lippmann hologram layer 14 is not provided with the heat sealing layer. As a result, the Lippmann hologram layer 14 is not directly bonded with the transparent layer 13 and the transparent layer 15. By bonding the transparent layer 13 with the transparent layer 15 at an outer peripheral portion A401, the Lippmann hologram layer 14 is held inside the card.

The layer configuration of the card 401 can thus be simplified.

In addition, as shown in FIG. 7A, the printed image 1b is positioned more inward than the Lippmann hologram layer 14. As a result, in the card 401, an outline of the Lippmann hologram layer 14 does not overlap the printed image 1b, thereby improving appearance of the printed image 1b.

As in the third embodiment, the heat sealing layer can also be provided in the present embodiment in order to suppress separation of the Lippmann hologram layer 14.

The embodiments of the present invention have been described above; however, the present invention is not limited thereto and can be altered or modified in various ways as the modifications described below, and such alterations and modifications are within the technical scope of the present invention. In addition, the effects described in the embodiments are merely examples of the most preferable effects provided by the present invention. The effects of the present invention are not limited thereto. The above-described embodiments and the following modifications can be used in suitable combinations although a detailed description thereof is omitted.

(Modifications)

(1) In the embodiments, an example in which the Lippmann hologram layer 14 is provided in a limited region of the card 1 in a plan view has been described; however, the present invention is not limited thereto. For example, the Lippmann hologram layer 14 can be provided in an entire region of the card 1, as the other layers, in the same dimensions as the outer dimensions of the card 1.

(2) In the embodiments, an example in which the transparent layer 15 is not a printing layer has been described; however, the present invention is not limited thereto. For example, the transparent layer 15 can be a printing layer onto which printing by the laser irradiation can be performed, in the same way as the laser coloring layer 12. By thus providing two printing layers, design and security characteristics can be improved.

In addition, by printing figures and the like of conforming shapes on the transparent layer 15 and the laser coloring layer 12, an effect of preventing counterfeiting and security characteristics can further be improved.

(3) In the embodiments, an example in which the functional film layer is the Lippmann hologram layer has been described; however, the present invention is not limited thereto. The functional film layer is required only to transmit the laser beam. For example, an embossed hologram layer, a microtaggant film layer (a film layer on which a shape, characters, and the like are printed in a size of approximately 100 to 200 μm by 100 to 200 μm, that can be visually recognized by using a magnifying lens and the like), a colorless fluorescent film and the like can be used as the functional film layer.

(4) In the embodiments, an example of bonding the base material 11, the laser coloring layer 12, and the transparent layer 13 by a bonding layer, a sticky layer, or thermal compression bonding has been described; however, the present invention is not limited thereto. For example, the base material 11 and the laser coloring layer 12 can be formed integrally by coextrusion. Similarly, the base material 11, the laser coloring layer 12, and the transparent layer 13 can be formed integrally by coextrusion.

(5) In the embodiments, an example in which an image to be printed on the laser coloring layer 12 is a photographic image has been described; however, the present invention is not limited thereto. For example, the image to be printed on the laser coloring layer 12 can be a base image in a color complementary to that of the hologram image in the Lippmann hologram layer 14 (for example, the base image on the laser coloring layer 12 would be black if a hologram is green). This can improve appearance (texture) of the hologram image. The base image can also be printed on the base material 11.

(6) In the embodiments, an example in which printing is performed on the laser coloring layer 12 has been described; however, the present invention is not limited thereto. Printing can be performed on any layer. For example, by printing figures and the like of conforming shapes on the transparent layer 15, which is the outermost layer, and the base material 11, an effect of preventing counterfeiting and security characteristics can further be improved.

EXPLANATION OF REFERENCE NUMERALS 1, 201, 301, 401 Card
11 Base material
12 Laser coloring layer
13 Transparent layer
14 Lippmann hologram layer
14a Heat sealing layer
15 Transparent layer

The invention claimed is:

1. An information storage medium comprising: a base material;
a laser coloring layer that is laminated on and above the base material and can produce color by laser irradiation;
a lower transparent layer that is laminated on and above the laser coloring layer and is translucent;
a functional film layer that is laminated on and above the lower transparent layer and is translucent; and
an upper transparent layer that is laminated on and above the functional film layer and is translucent,
wherein the lower transparent layer is configured to function as a heat insulator and-to prevent heat generated by the laser coloring layer by the laser irradiation from being directly transferred to the functional film layer,
wherein the functional film layer is smaller than the upper transparent layer and the lower transparent layer when viewed in a direction perpendicular to an external surface of the information storage medium, wherein the upper transparent layer and the lower transparent layer are bonded to each other outside a periphery of the functional film layer, and wherein the functional film layer is a hologram layer, and wherein the laser coloring layer, lower transparent layer, upper transparent layer and base material are all the same size as viewed from a plan view of the information storage medium.

2. The information storage medium according to claim 1, wherein the functional film layer is smaller than the information storage medium when viewed from a normal direction of a surface of the information storage medium.

3. The information storage medium according to claim 2, wherein the functional film layer is provided with a heat sealing layer on at least any one of a side of the functional film layer facing the upper transparent layer or a side of the functional film layer facing the lower transparent layer.

4. The information storage medium according to claim 1, wherein the functional film layer is provided with a heat sealing layer on at least one of a side of the functional film layer facing the upper transparent layer or a side of the functional film layer facing the lower transparent layer.

5. The information storage medium according to claim 4, wherein the functional film layer can have a region overlapping a region of the laser coloring layer colored by the laser irradiation when viewed from a normal direction of a surface of the information storage medium.

6. The information storage medium according to claim 4, wherein the functional film layer can be formed on an inner side of an outer periphery of a region of the laser coloring layer colored by the laser irradiation when viewed from a normal direction of a surface of the information storage medium.

7. The information storage medium according to claim 1, wherein the functional film layer can have a region overlapping a region of the laser coloring layer colored by the laser irradiation when viewed from a normal direction of a surface of the information storage medium.

8. The information storage medium according to claim 7 wherein the laser coloring layer is translucent.

9. The information storage medium according to claim 1, wherein the functional film layer can be formed on an inner side of an outer periphery of a region of the laser coloring layer colored by the laser irradiation when viewed from a normal direction of a surface of the information storage medium.

10. The information storage medium according to claim 9, wherein the laser coloring layer is translucent.

11. The information storage medium according to claim 1, wherein the laser coloring layer is translucent.

12. A method for printing in the information storage medium according to claim 1 comprising
irradiating the information storage medium with a laser beam from an upper side thereof, making the laser beam pass through the upper transparent layer, the functional film layer, and the lower transparent layer, to thereby color the laser coloring layer and form the information.

13. A method for printing in the information storage medium according to claim 3 comprising
irradiating the information storage medium with a laser beam from an upper side thereof, making the laser beam pass through the upper transparent layer, the functional film layer, and the lower transparent layer, to thereby color the laser coloring layer and form the information.

14. A method for printing in the information storage medium according to claim 5 comprising
irradiating the information storage medium with a laser beam from an upper side thereof, making the laser beam pass through the upper transparent layer, the functional film layer, and the lower transparent layer, to thereby color the laser coloring layer and form the information.

15. A method for printing in the information storage medium according to claim 6 comprising
irradiating the information storage medium with a laser beam from an upper side thereof, making the laser beam pass through the upper transparent layer, the functional film layer, and the lower transparent layer, to thereby color the laser coloring layer and form the information.

* * * * *